US012664519B2

(12) United States Patent
Tishbi et al.

(10) Patent No.: US 12,664,519 B2
(45) Date of Patent: Jun. 23, 2026

(54) SYSTEM AND METHOD FOR DEPLOYING SOFTWARE APPLICATIONS OVER A UNIFIED DATA SET

(71) Applicant: Avalor Technologies, Ltd., Ramat Gan (IL)

(72) Inventors: Kfir Aharon Tishbi, Herzliya (IL); Raanan Raz, Tel Aviv (IL)

(73) Assignees: Avalor Technologies, Ltd., Ramat Gan (IL); Zscaler, Inc., San Jose, CA (US)

( * ) Notice: Subject to any disclaimer, the term of this patent is extended or adjusted under 35 U.S.C. 154(b) by 322 days.

(21) Appl. No.: 18/317,580

(22) Filed: May 15, 2023

(65) Prior Publication Data

US 2024/0386378 A1      Nov. 21, 2024

(51) Int. Cl.
*G06Q 10/10*          (2023.01)
(52) U.S. Cl.
CPC .................................. *G06Q 10/103* (2013.01)
(58) Field of Classification Search
None
See application file for complete search history.

(56) References Cited

U.S. PATENT DOCUMENTS

| | | | |
|---|---|---|---|
| 8,447,739 B2 | 5/2013 | Naibo et al. | |
| 9,280,788 B2 | 3/2016 | Ferrari et al. | |
| 9,519,636 B2 | 12/2016 | Cras | |
| 9,626,453 B2 | 4/2017 | Koerner et al. | |
| 9,684,699 B2 | 6/2017 | Delgobbo et al. | |
| 9,842,137 B2 | 12/2017 | Faerber et al. | |
| 10,395,271 B2 | 8/2019 | Kassko et al. | |
| 10,585,886 B2 * | 3/2020 | Ferrari ............. | G06F 16/24539 |
| 10,754,877 B2 * | 8/2020 | Kassko ............... | G06F 16/2219 |
| 11,783,515 B2 | 10/2023 | Sheffer et al. | |
| 2020/0259728 A1 | 8/2020 | Oren et al. | |

* cited by examiner

*Primary Examiner* — Atta Khan
(74) *Attorney, Agent, or Firm* — Baratta Law PLLC; Lawrence A. Baratta, Jr.; Ryan Odessa

(57)          ABSTRACT

A system and method for generating an application layer for a representation graph is disclosed. The method includes defining a data entity in a representation graph, the data entity including a plurality of data fields; generating a node based on the data entity in the representation graph, the node representing a unique entity; receiving data respective of the unique entity from a plurality of data sources, such that a first data source of the plurality of data sources provides data to a first data field of the plurality of data fields, and a second data source of the plurality of data sources provides data to a second data field of the plurality of data fields; applying a control to the node based on the received data; and initiating an action based on applying the control to the received data.

20 Claims, 7 Drawing Sheets

SYSTEM AND METHOD FOR DEPLOYING SOFTWARE APPLICATIONS OVER A UNIFIED DATA SET

TECHNICAL FIELD

The present disclosure relates generally to data systems, and specifically to exposing data from multiple sources in a unified data set.

BACKGROUND

Ever present, computing environments have been an underlying infrastructure to much of the world we know for the past few decades. Increasingly, these computer systems grow in complexity, occasionally replacing old components with new, though more often the case, new capabilities are added to existing ones, in the form of computer systems being built layer upon layer. The most sophisticated operating systems still carry to this day legacy code and software, to support the same.

Additionally, computing environments may be networked (i.e., local area networks), cloud computing environments, hybrid computing environments, combinations thereof, and the like. This is advantageous for reasons of security, and also to take advantage of different capabilities each environment offers.

Each of these environments can be monitored by various cybersecurity solutions. Additionally, computing environments can interact with other computing environments, with Software as a Service (SaaS) providers, and the like. These solutions are often provided by competitors and as such may not always communicate with each other.

Thus, a computing environment interacting with many other environments only exposes a portion of itself to those other environments, and no single environment is able to have a full picture of the computing environment itself. This can result, for example, in decision making which is based on partial data.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for generating an application layer for a representation graph. The method also includes defining a data entity in a representation graph, the data entity including a plurality of data fields; generating a node based on the data entity in the representation graph, the node representing a unique entity; receiving data respective of the unique entity from a plurality of data sources, such that a first data source of the plurality of data sources provides data to a first data field of the plurality of data fields, and a second data source of the plurality of data sources provides data to a second data field of the plurality of data fields; applying a control to the node based on the received data; and initiating an action based on applying the control to the received data. Other embodiments of this aspect include corresponding computer systems, apparatus, and computer programs recorded on one or more computer storage devices, each configured to perform the actions of the methods.

Implementations may include one or more of the following features. The method may include: periodically accessing the first data resource to receive data respective of the unique entity. The method may include: applying the control including a service level agreement (SLA) policy on the node based on the received data. The method may include: initiating an action at the second data source, based on data received from the first data source. The first data source is a first cybersecurity monitoring solution, and the second data source is a second cybersecurity monitoring solution. The action includes: generating an alert, generating an event in an event log, generating a ticket, generating a ticket group, initiating a scan of a cybersecurity object, generating a report, and any combination thereof. The method may include: configuring an application programming interface (API) to extract data from the node in response to receiving a request for data. The method may include: extracting data from the node in response to further detecting that the request is an authorized request. The method may include: traversing an organization chart to detect a user account, the organization account including a plurality of unique user accounts, each user account associated with a role; assigning a unique node of the representation graph to a user account, in response to detecting a data value of the user account which matches a data value of the unique node. Implementations of the described techniques may include hardware, a method or process, or computer software on a computer-accessible medium.

One general aspect includes a non-transitory computer readable medium having stored thereon instructions for causing a processing circuitry to execute a process. The non—transitory computer readable medium also includes defining a data entity in a representation graph, the data entity including a plurality of data fields; generating a node based on the data entity in the representation graph, the node representing a unique entity; receiving data respective of the unique entity from a plurality of data sources, such that a first data source of the plurality of data sources provides data to a first data field of the plurality of data fields, and a second data source of the plurality of data sources provides data to a second data field of the plurality of data fields; applying a control to the node based on the received data; and initiating an action based on applying the control to the received data. Other embodiments of this aspect include corresponding computer systems, apparatus, and computer programs recorded on one or more computer storage devices, each configured to perform the actions of the methods.

One general aspect includes a system for generating an application layer for a representation graph. The system also includes a processing circuitry. The system also includes a memory, the memory containing instructions that, when executed by the processing circuitry, configure the system to: define a data entity in a representation graph, the data entity including a plurality of data fields; generate a node based on the data entity in the representation graph, the node representing a unique entity; receive data respective of the unique entity from a plurality of data sources, such that a first data source of the plurality of data sources provides data to a first data field of the plurality of data fields, and a second data source of the plurality of data sources provides data to a second data field of the plurality of data fields; apply a control to the node based on the received data; and initiate an action based on applying the control to the received data. Other embodiments of this aspect include corresponding computer systems, apparatus, and computer programs recorded on one or more computer storage devices, each configured to perform the actions of the methods.

Implementations may include one or more of the following features. The system where the memory includes further instructions which when executed by the processing circuitry further configure the system to: periodically access the first data resource to receive data respective of the unique entity. The memory includes further instructions which when executed by the processing circuitry further configure the system to: apply the control including a service level agreement (sla) policy on the node based on the received data. The memory includes further instructions which when executed by the processing circuitry further configure the system to: initiate an action at the second data source, based on data received from the first data source. The first data source is a first cybersecurity monitoring solution, and the second data source is a second cybersecurity monitoring solution. The memory includes further instructions which when executed by the processing circuitry further configure the system to initiate an action including: generating an alert, generating an event in an event log, generating a ticket, generating a ticket group, initiating a scan of a cybersecurity object, generating a report, and any combination thereof. The memory includes further instructions which when executed by the processing circuitry further configure the system to: configure an application programming interface (API) to extract data from the node in response to receiving a request for data. The memory includes further instructions which when executed by the processing circuitry further configure the system to: extract data from the node in response to further detecting that the request is an authorized request. The memory includes further instructions which when executed by the processing circuitry further configure the system to: traverse an organization chart to detect a user account, the organization account including a plurality of unique user accounts, each user account associated with a role; assign a unique node of the representation graph to a user account, in response to detecting a data value of the user account which matches a data value of the unique node. Implementations of the described techniques may include hardware, a method or process, or computer software on a computer-accessible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
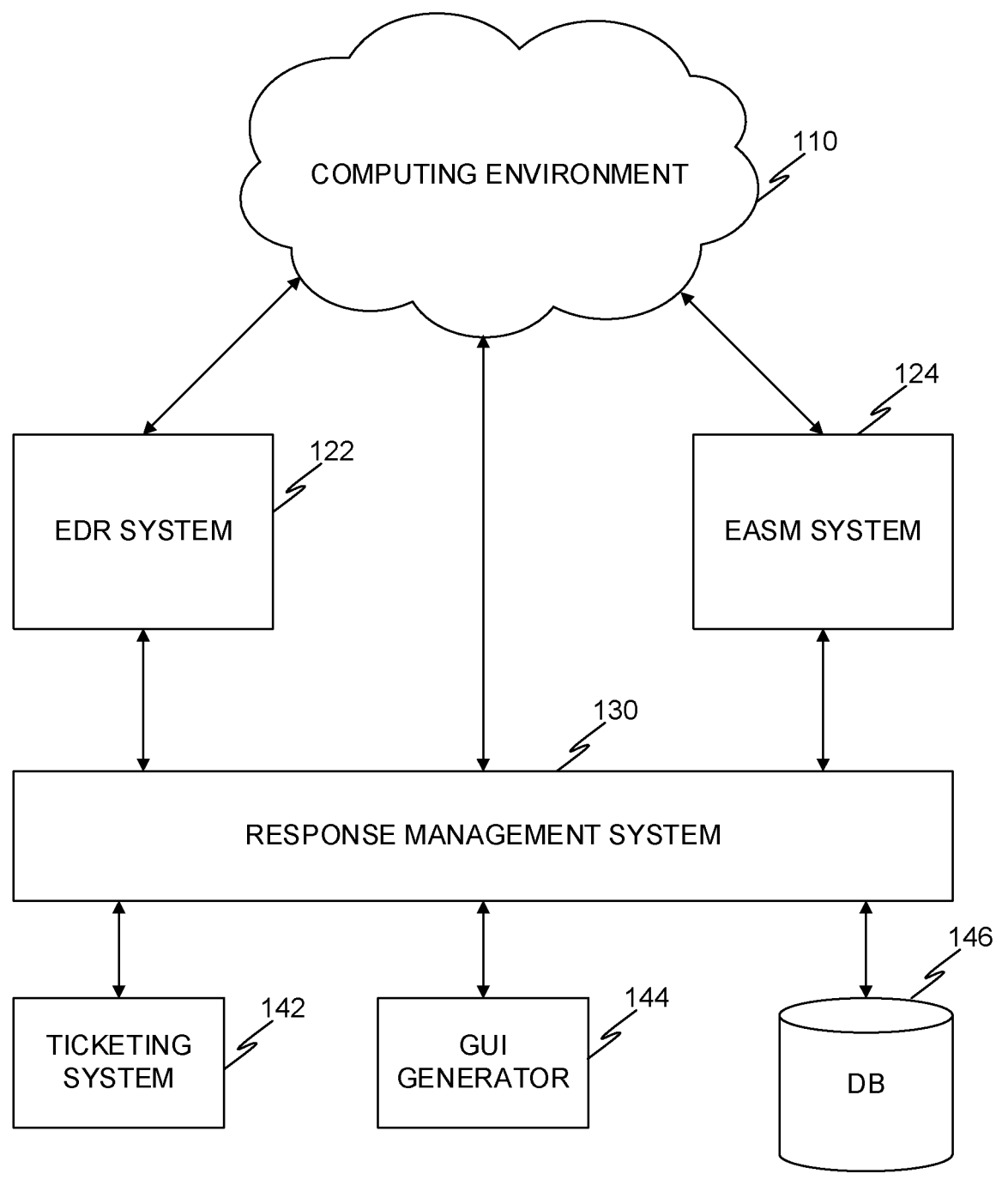
FIG. 1 is an example of a network diagram of a response management system, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A system and method is disclosed for providing software applications over a unified dataset. In some embodiments, a unified dataset is generated based on receiving data from multiple systems, including ticketing systems, cybersecurity monitoring systems, SaaS solutions, and the like.

In certain embodiments, a representation of an entity of a computer environment is stored in a graph database, for example in a representation graph. In some embodiments, an uber node represents an entity by aggregating data from multiple data sources, such that each data source interacts, or otherwise represents, the entity.

In an embodiment, a mapper, a rule engine, and the like, are configured to expose data from multiple resources, for example by utilizing the representation graph. In some embodiments, a data entity is defined, and a control, an action, and the like, are applied based on data of the data entity, as explained in more detail below.

In some embodiments, an application layer is generated for the representation graph. In an embodiment, the representation layer includes an API through which data from the unified dataset is exposed. For example, in some embodiments the API is configured to receive queries, such as structured queries, unstructured queries, a combination thereof, and the like, parse the query to detect values, and search the representation graph for an entity having a value matching the detected values.

FIG. 1 is an example of a network diagram 100 of a response management system, utilized to describe an embodiment. A computing environment 110 is communicatively coupled with a response management system 130. In an embodiment, the computing environment 110 is an on-prem (i.e., on-premises) computer network, a cloud computing environment, a hybrid cloud computing environment, and the like. A cloud computing environment may be, for example, utilized as a virtual private cloud (VPC) over Amazon® Web Services, a VNet on Microsoft® Azure, and the like.

The cloud computing environment 110 includes a plurality of resources. A resource is, in an embodiment, an endpoint, a computing device, a user device, a server, a virtual computing device, a virtual machine, a software container, a serverless function, an appliance, a managed image, a virtual disk, a storage bucket, a software application, and the like. In an embodiment, a resource includes a cybersecurity issue. A cybersecurity issue may be, for example, a misconfiguration, a vulnerability, an exposure, a malware, and the like.

In certain embodiments, the computing environment 110 is communicatively connected with an endpoint detection and response (EDR) system 122, and an external attack surface management (EASM) system 124. In an embodiment, the EDR system 122 is configured to detect cybersecurity threats on endpoints of the computing environment 110. An endpoint is a resource which connects the computing environment 110 to computers, networks, and the like, which are external to the computing environment 110. An endpoint may be, for example, a user device, a gateway, a server, and the like. In an embodiment, the EDR system 122 is further configured to generate an alert in response to detecting a cybersecurity issue.

In an embodiment, the EASM system 124 is configured to discover resources which are external facing of the computing environment 110. An external facing resource is a resource which is configured to communicate or otherwise interact with resources which are outside of the computing environment 110. An example of an external facing resource is a webserver, such as Nginx® deployed on a virtual machine inside the computing environment 110. The webserver provides connectivity between resources in the computing environment 110 to resources, client devices, third party applications, third party services, and the like, which are all external to the computing environment 110. In an embodiment, the EASM system 124 is configured to generate an alert in response to detecting a cybersecurity issue detected on an external facing resource.

In some embodiments, the EDR system 122 and EASM system 124 provide overlapping detection of cybersecurity issues. However, since the EDR system 122 and the EASM system 124 do not communicate with each other, each generates an alert for what is possibly the same security issue. If the EDR system 122 and the EASM system 124 are both connected to a ticketing system 142 (or ticket management system 142) each would generate an alert for the ticketing system 142. In an embodiment, the ticketing system 142 is configured to generate a ticket for each received alert. As noted above, generation of excessive tickets leads to alert fatigue, an outcome which it is desirable to avoid.

In an embodiment, a ticket is stored as a task, an event, similar data structure, and the like, and is assigned to a user account, a group of user accounts, and the like. In some embodiments, a ticket, task, even, data structure, and the like, is assigned to a user account selected from an organization chart. In an embodiment, an organization chart is traversed to detect a user account, wherein the user account is associated with data, metadata, and the like. In certain embodiments, the data, metadata, and the like, is compared to data associated with the ticket, in order to detect a user account which can be associated with the user account. The ticket is then associated with a user account having data, metadata, and the like value(s), which match data, metadata, and the like, of the ticket, task, event, ticket group, and the like.

A user account associated with a task (i.e., with a ticket) is responsible for performing mitigation of the cybersecurity issue which caused the ticket to be generated. In certain embodiments, a ticket is a data structure which includes an identifier of the cybersecurity issue, an identifier of a user account, and identifier of a user group, an identifier of a resource on which the cybersecurity issue was detected, and the like. For example, a CVE (Common Vulnerability and Exposure) database identifier is an identifier of a cybersecurity issue.

In certain embodiments, an alert includes an identifier of the cybersecurity issue, an identifier of the resource on which the cybersecurity issue was detected, a timestamp, additional details, and the like. For example, a cybersecurity issue may be detecting that a software version is out of date. The alert generated based on this detection includes, in an embodiment, an identifier of the software (e.g., Windows® XP) and the issue with the software (e.g., "out of date").

In an embodiment, the response management system 130 is connected to the EDR system 122 and the EASM system 124. While two cybersecurity monitoring solutions are presented in this example, it is evident that in other embodiments other cybersecurity monitoring solutions can be communicatively connected with the response management system 130 which receives alerts, events, data, combinations thereof, and the like, generated by such cybersecurity monitoring solutions. By providing tickets to the response management system 130 rather than directly to the ticketing system 142, the response management system 130 is able to preprocess alerts from the cybersecurity monitoring solutions and generate improved tickets, reducing the number of tickets by detecting duplications, and the like. Various methods for improving ticket management and generation are disclosed herein.

In an embodiment, an improved ticket is augmented with a context of the alert based on the customer environment, the organizational structure, and the like. For example, a ticket is augmented with information about a role, in response to determining that a plurality of alerts are generated from endpoints which are all utilized by user accounts having in common the role. Role information may be, for example, an identifier, a list of permission, privileges, and the like.

For example, in an embodiment the response management system 130 is configured to receive a first alert from a first cybersecurity monitoring system (e.g., EDR system 122) and a second alert from a second cybersecurity monitoring system (e.g., EASM system 124). In an embodiment, the response management system 130 is configured to determine that the first alert and the second alert are generated based on the same cybersecurity issue, which was detected by different systems. In certain embodiments, the response management system 130 is configured to generate a unified ticket based on the received first alert and second alert.

In some embodiments, determining that the first alert and the second alert indicate the same cybersecurity issue includes detecting an identifier of a resource in the first alert which matches an identifier of a resource in the second alert, and detecting in the first alert a cybersecurity issue identifier which matches a cybersecurity issue identifier detected in the second alert.

In certain embodiments, the response management system 130 is configured to determine a severity score for the generated ticket. In some embodiments the severity score is determined based on the received first alert and the second alert. For example, each alert is associated with a severity score, for example based on a determined policy. In some embodiments, the response management system 130 is configured to determine a ticket severity score based on the severity score of the received alerts.

In some embodiments, the response management system 130 is further connected to a graphical user interface (GUI) generator 144 and a graph database 146. In an embodiment, the GUI generator 144 is configured to generate for display a ticketing user interface, which, in an embodiment, is configured to receive a request from a user to generate a view of tickets associated with a particular user account, user group, and the like.

In certain embodiments, the response management system 130 is configured to generate a representation of alerts, tickets, and the like as nodes stored in a graph of the graph database 146. A graph database 146 is, in an embodiment, Neo4j®, for example. In some embodiments, the response management system 130 is configured to generate group nodes, which represent a group of nodes, each node representing an object. In an embodiment, an object is an asset (e.g., a workstation, a server, an endpoint, an application, resource, and the like), a source code repository (e.g., GitHub®, etc.), an identity and access management (IAM) system, an organizational chart, an alert, a ticket, and the like. For example, a group of tickets is represented by a group node, which is connected to a plurality of nodes, each node of the plurality of nodes representing a unique ticket of the group of tickets.

In an embodiment, the response management system 130 further includes a rule engine (not shown) having a plurality of rules. In certain embodiments, a rule of the plurality of rules is applied to an alert, and a ticket is generated based on the outcome of applying the rule to the alert. For example, in an embodiment a rule may be to group alerts based on a detected cybersecurity issue if the cybersecurity issue is detected on a resource having the same, or similar, attributes.

For example, a plurality of alerts are generated by a cybersecurity monitoring system, each alert pertaining to a different virtual machine deployed in a cloud computing environment based on the same base image, the alert indicating that the virtual machine includes a vulnerability such as CVE-2022-29255. When a rule is applied to the plurality of alerts, a single ticket is generated, indicating that a plurality of virtual machines deployed in the cloud computing environment all share a similar vulnerability. By displaying a single ticket rather than each of the plurality of alerts, the amount of displayed alerts is reduced, thus reducing alert fatigue and reducing resources utilized in rendering and displaying the plurality of alerts.

Figure 2:
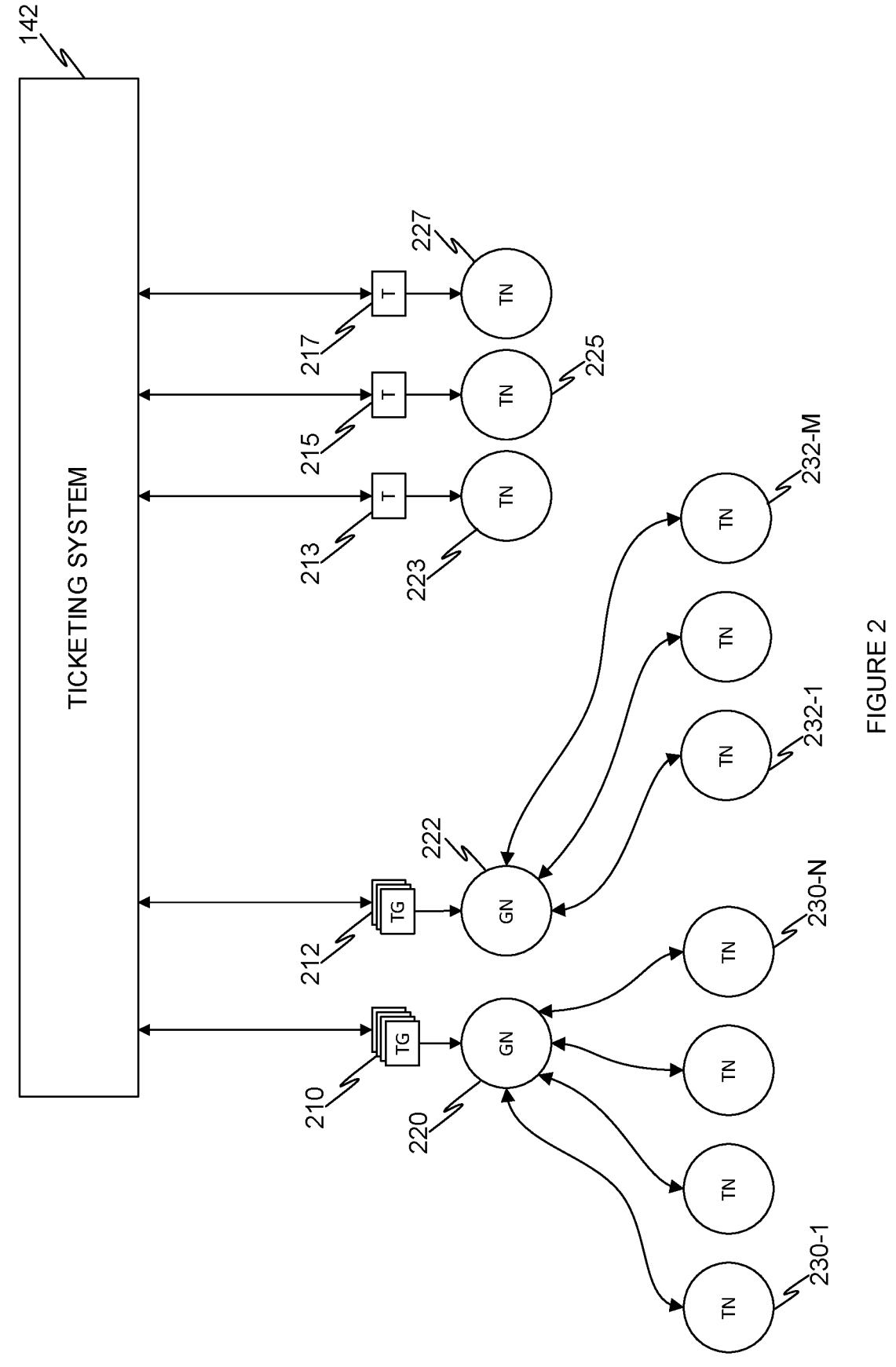
FIG. 2 is an example diagram of a ticket management system generating support tickets and their representation on a graph database, utilized to describe an embodiment.

FIG. 2 is an example diagram of a ticket management system generating support tickets and their representation on a graph database, utilized to describe an embodiment. In an embodiment, a ticket management system 142 (or ticketing system 142) is, for example, Jira®, Redmine®, and the like.

A ticketing system 142 is configured, in an embodiment, to receive alerts from a plurality of cybersecurity monitoring solutions, and generate tickets based on the received alerts. In an embodiment, a cybersecurity monitoring solution is configured to provide a zero-trust network solution, endpoint protection, data loss prevention, network filtering, web content filtering, secure code, and the like. In certain embodiments, a cybersecurity monitoring solution is further configured to scan computers, virtual machines, software containers, serverless functions, and the like, to detect cybersecurity issues, such as malware, exposed passwords, weak passwords, misconfigurations, combinations thereof, and the like.

In an embodiment a cybersecurity monitoring solution is configured to generate an alert when a cybersecurity issue is detected. For example, when a scanner detects a malware object on a disk of a virtual machine, an alert is generated to indicate that the malware object was detected on the virtual machine. In an embodiment, the alert includes data identifying the resource on which the alert is generated, data identifying the detected cybersecurity issue (e.g., an identifier of the malware, hash signature of the malware, etc.), a timestamp, and the like.

In some embodiments the response management system 130 is configured to generate a new alert, generate an updated alert, update an existing alert, and the like.

In an embodiment, the ticketing system 142 is configured to generate tickets, such as first ticket 213, second ticket 215, and third ticket 217. The ticketing system 142 is further configured, in an embodiment, to generate ticket groups, such as first ticket group 210 and second ticket group 212. A ticket group is generated in an embodiment based on applying a rule to a group of tickets. For example, a rule states that if a group of tickets each include a cybersecurity vulnerability detected on a software container deployed in a first VPC of an AWS cloud computing environment, and the tickets differ only by the name of the software container, then a ticket group is generated for the group of tickets. In certain embodiments, a ticket group includes a flag, indicator, and the like, to distinguish between single tickets and ticket groups.

In certain embodiments, a ticket group, such as first ticket group 210 is represented in a graph as a group node 220. The group node 220 is connected to a plurality of ticket nodes 230-1 through 230-N, referred to singularly as ticket node 230 and generally as ticket nodes 230, where 'N' is an integer having a value of '2' or more. In an embodiment each ticket node 230 represents a unique ticket. In some embodiments, each ticket node 230 represents a unique alert.

In some embodiments, the group node 220 includes data which is common to each ticket of the group of tickets. By storing common data only in the ticket group node 220, and not the individual nodes, a compact representation is achieved, as duplicated data is not stored. For example, where a group of tickets 212 has a common vulnerability, an identifier of the common vulnerability is stored in the metadata of group node 222 which represents each ticket 232-1 through 232-M, where 'M' is an integer having a value of '2' or more. The identifier of the common vulnerability is not stored with each ticket node 232, thereby reducing the amount of storage required to store the ticket nodes 232.

In certain embodiments, a ticket node, ticket group node, and the like, include a tag which indicates if the corresponding node is part of a view. A view includes a group of nodes, a representation of which is visually rendered for display, for example by a GUI generator, such as the GUI generator 144 of FIG. 1 above. For example, a response management system is configured, in an embodiment, to receive a request to render a visualization showing all open tickets. An open ticket is a ticket for which the underlying issue which caused the generation of the ticket is still active. For example, if a cybersecurity threat was not addressed, for example, by updating a software version, the ticket remains in open status until the action to address it occurs. In certain embodiments a ticket node, such as first ticket node 223, includes a tag indicating a status of the ticket, for example that the ticket is an open ticket, a resolved ticket, and the like.

In some embodiments, the graph is traversed to detect ticket nodes, group nodes, and the like, which include a tag indicating the node should be displayed in a result, and a tag indicating that the node represents a ticket or group of tickets, which are in open status. In some embodiments, providing an interaction with a group node, such as first group node 220, initiates execution of an instruction which configures a GUI to render a visualization based on the ticket nodes 230 connected to the first group node 220. For example, in an embodiment, the interaction is a click received through a mouse, a touch received through a touch screen, and the like. Displaying initially a ticket group, and displaying an expansion of that ticket group is advantageous as it allows to initially present a reduced view (i.e., displaying a group ticket rather than all the tickets which comprise together the group), while still allowing a user to quickly expand the view to achieve greater depth of information (by viewing all the tickets which comprise an interacted-with ticket group). This reduces the initial amount of rendering required to be performed by a processing circuitry, as rendering a single ticket group requires less processing than rendering a plurality of tickets.

Figure 3:
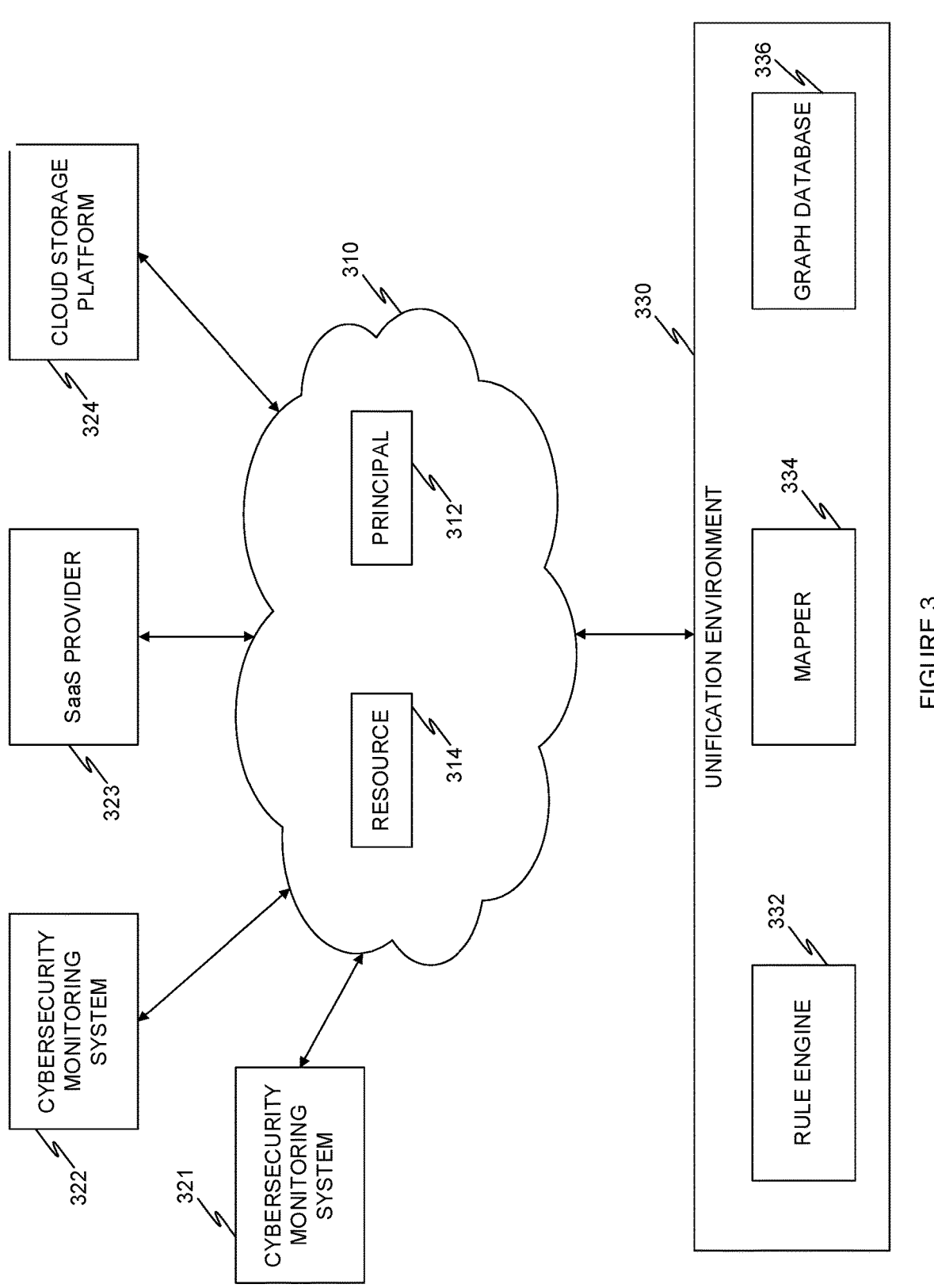
FIG. 3 is an example network diagram of a compute environment monitored by a plurality of cybersecurity monitoring solutions, utilized to describe an embodiment.

FIG. 3 is an example network diagram of a compute environment monitored by a plurality of cybersecurity monitoring solutions, utilized to describe an embodiment. In an embodiment, the computing environment 510 is a cloud computing environment, a local computing environment, a hybrid computing environment, and the like. For example, in some embodiments, a cloud computing environment is implemented on a cloud computing infrastructure. For example, the cloud computing environment is a virtual private cloud (VPC) implemented on Amazon® Web Services (AWS), a virtual network (VNet) implemented on Microsoft® Azure, and the like.

In an embodiment, the cloud computing environment includes multiple environments of an organization. For example, a cloud computing environment includes, according to an embodiment, a production environment, a staging environment, a testing environment, and the like.

In certain embodiments, the computing environment 310 includes entities, such as resource and principals. A resource 314 is, for example, a hardware resource, a software resource, a computer, a server, a virtual machine, a serverless function, a software container, an asset, a combination thereof, and the like. In an embodiment, a resource 314 exposes a hardware resource, provides a service, provides access to a service, a combination thereof, and the like.

In some embodiments, a principal 312 is authorized to act on a resource 314. For example, in a cloud computing environment, a principal 312 is authorized to initiate actions in the cloud computing environment, act on the resource 314, and the like. A principal is, according to an embodiment, a user account, a service account, a role, and the like. In some embodiments, a resource 314 is deployed in a production environment, and another resource (not shown) which corresponds to the resource 314 is deployed in a staging environment. This is utilized, for example, when testing the performance of a resource in an environment which is similar to the production environment. Having multiple compute environments, where each environment corresponds to at least another compute environment, is a principal of software development and deployment known as continuous integration/continuous deployment (CI/CD).

In an embodiment, the computing environment 310 is communicatively coupled with a first cybersecurity monitoring system 321, a second cybersecurity monitoring system 322, a SaaS provider 323, a cloud storage platform 324, and the like. A cybersecurity monitoring system includes, for example, scanners and the like, configured to monitor a compute environment for cybersecurity threats such as malware, exposures, vulnerabilities, misconfigurations, and the like. In some embodiments, having multiple cybersecurity monitoring systems is advantageous, as each cybersecurity monitoring system may be configured to provide different capabilities, such as scanning for different types of cybersecurity threats.

According to some embodiments, each of the first cybersecurity monitoring system 321, the second cybersecurity monitoring system 322, the SaaS provider 323, the cloud storage platform 324, and the like, are configured to interact with the compute environment 310. For example, the cybersecurity monitoring systems (321 and 322) are configured to monitor assets, such as resources, of the computing environment 310. Each system which interacts with the computing environment 310 has data, metadata, and the like, which the system utilizes for interacting with the computing environment 310.

For example, a cybersecurity monitoring system is configured to store a representation of the computing environment, for example as a data model which includes detected cybersecurity threats. Such a representation, model, and the like, is a source, for example for modeling the compute environment 310. In some embodiments, a source provides data, for example as a data stream, including records, events, and the like. For example, a data stream includes, according to an embodiment, a record of a change to the compute environment, an event indicating detection of the change, communication between resources, communication between a principal and a resource, communication between principals, combinations thereof, and the like.

In an embodiment, a SaaS provider 323 is implemented as a computing environment which provides software as a service, for example a client relationship management (CRM) software, a sales management software (e.g., Salesforce®), and the like.

In some embodiments, a cloud storage platform 324 is implemented as a cloud computing environment which provides a service to the compute environment. For example, in certain embodiments, the cloud storage platform 324 is a storage service, such as Amazon® Simple Storage Solution (S3).

In an embodiment, a unification environment 330 is communicatively coupled with the compute environment 310. In certain embodiments, the unification environment 330 is configured to receive data from a plurality of sources, such as the cloud storage platform 324, the SaaS provider 323, and the cybersecurity monitoring systems 322 and 321.

According to an embodiment, the unification environment 330 includes a rule engine 332, a mapper 334, and a graph database 336. In some embodiments, a rule engine 332 is deployed on a virtual machine, software container, serverless function, combination thereof, and the like. In an embodiment, the mapper 334 is configured to receive data from a plurality of sources, and store the data based on at least a predefined data structure (e.g., of a graph) in the graph database 336. A graph database 336 is, in an embodiment, Neo4j®, for example. In some embodiments, the predefined data structure includes a plurality of data fields, each data field configured to store at least a data value.

In certain embodiments, the data structure is a dynamic data structure. A dynamic structure is a data structure which changes based on an input. For example, in certain embodiments a source provides a data field which is not part of the predefined data structure of a graph stored in the graph database 336. In such embodiments, the mapper 334 is configured to redefine the predefined data structure to include the data field which was not previously part of the predefined data structure.

In some embodiments, the mapper 334 is configured to map a data field of a first source and a data field of a second source to a single data field of the predefined data structure. An example of such mapping is discussed in more detail with respect to FIG. 3 below. In certain embodiments, the mapper 334 is configured to store a mapping table which indicates, for each data source, a mapping between a data field of the source and a data field of a predefined data structure of the graph stored in the graph database 336.

The graph database 336 is configured to store a representation of data from a plurality of data sources, each data source representing, interacting with, and the like, the compute environment 310, according to an embodiment. For example, in some embodiments, the graph database 336 is configured to store a representation of principals, resources, events, enrichments, and the like.

In some embodiments, the mapper 334 is configured to utilize a rule engine 332 to determine which data field from a first source is mapped to a data field of the predefined data structure. In certain embodiments, the rule engine 332 includes a rule which is utilized by the mapper 334 to determine what data to store in a data conflict event. In some embodiments the rule engine 332 is configured to store a rule, a policy, combinations thereof, and the like. In certain embodiments, the rule engine 332 is a multi-tenant rule engine, serving a plurality of compute environment 310. In such embodiments, the rule engine 332 is configured to apply rules per tenant. For example, a first tenant utilizes a first source mapped using a first mapping, while a second tenant utilizes the first source mapped using a second mapping.

In certain embodiments, the rule engine 332 includes a control. A control is a rule, condition, and the like, which is applied to an entity of the compute environment 310. An entity is, for example, a principal, a resource, an event, and the like, according to an embodiment. In some embodiments, the control is implemented using a logic expression, such as a Boolean logic expression. For example, in an embodiment, a control includes an expression such as "NO 'Virtual Machine' HAVING 'Operating System' EQUAL 'Windows 7'". In some embodiments, the rule engine 332 is configured to traverse the graph stored in the graph database 336 to determine if a representation stored thereon violates a control.

Figure 4:
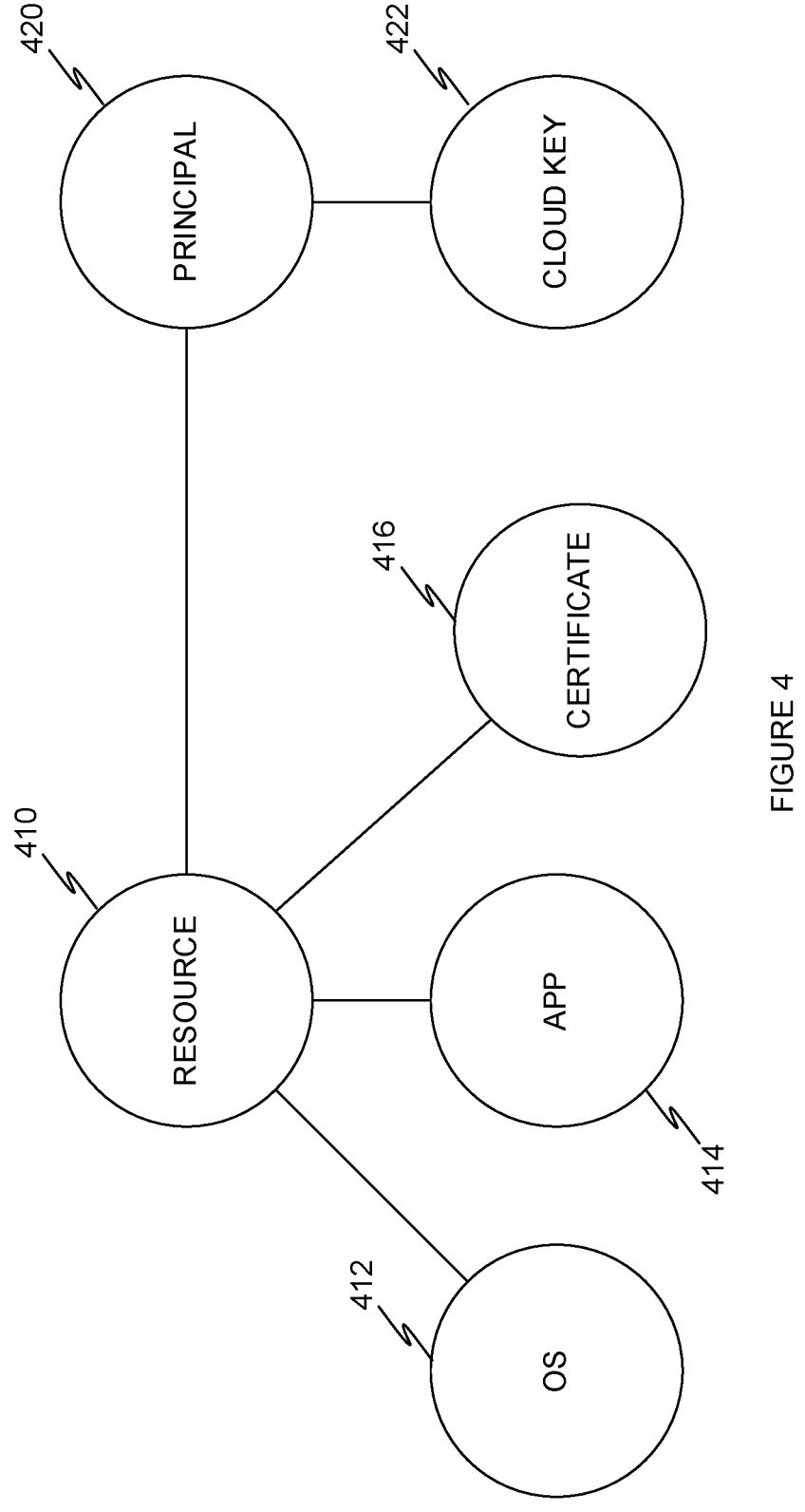
FIG. 4 is an example graph representing a compute environment from a plurality of sources, implemented in accordance with an embodiment.

FIG. 4 is an example graph representing a compute environment from a plurality of sources, implemented in accordance with an embodiment. In an embodiment, a compute environment is monitored by a plurality of cybersecurity monitoring solutions. For example, in an embodiment a cloud computing environment is monitored by a first cybersecurity monitoring solution (e.g., Snyk®), and a second cybersecurity monitoring solution (e.g., Rapid7®). The plurality of cybersecurity monitoring solutions differ from each other, for example by monitoring for different cybersecurity threats, monitoring different assets, monitoring different principals, monitoring different data fields, storing different data, and the like. For example, in an embodiment a first cybersecurity monitoring solution is configured to store a unique identifier of a resource under an "ID" data field, whereas a second cybersecurity monitoring solution is configured to store a unique identifier of the same resource as "Name". Respective of a unification environment, each cybersecurity monitoring solution is a source of the compute environment.

In some embodiments, it is therefore beneficial to utilize a single data structure to store data from multiple sources. In some embodiments, the data structure includes a metadata indicator to indicate an identifier of the source for a certain data field. In some embodiments, the data structure includes a metadata indicator to indicate that a data field value is cross-referenced between a plurality of sources. A metadata indicator is configured to receive a value, according to an embodiment, which corresponds to a predetermined status.

In an embodiment, a resource is represented by a resource node 710. A resource is, for example, a physical machine, a virtual machine, a software container, a serverless function, a software application, a platform as a service, a software as a service, an infrastructure as a service, and the like. In an embodiment, a resource node includes a data structure which is selected for the resource node based on a resource type indicator. For example, in an embodiment a first resource is a virtual machine for which a resource node is stored based on a first resource type, and a second resource is an application for which a resource node is stored based on a second resource type.

The resource node 710 is connected (e.g., via a vertex) to a principal node 720, an OS node 412, an application node 414, and a certificate node 416. In an embodiment, a vertex further indicates a relationship between the represented nodes. For example, a vertex connecting a resource node 710 to a principal node 720 indicates, according to an embodiment, that the principal represented by the principal node 720 can access the resource represented by the resource node 710. In an embodiment, the principal node 720 represents a principal, such as a user account, a service account, a role, and the like.

In an embodiment, a first cybersecurity monitoring solution detects a resource in a compute environment, and scans the resource to detect an operating system (OS). The resource is represented by the resource node 710, the operating system is represented by the OS node 412, and a vertex is generated between the resource node 710 and the OS node 412 to indicate that the OS is deployed on the resource. A second cybersecurity monitoring solution detects the resource in the compute environment, and further detects an application executed on the OS of the resource. The application is represented in the graph by the application node 414, and connected to the resource node 412. As the first cybersecurity monitoring solution already detected the resource, there is no need to duplicate the data and generate another representation of the resource based on the second cybersecurity monitoring solution. Instead, any data differences are stored in the resource node 710 representing the resource.

In some embodiments, a cybersecurity monitoring solution is further configured to scan the contents of a disk of the resource, and detect cybersecurity objects, such as an encryption key, a cloud key, a certificate, a file, a folder, an executable code, a malware, a vulnerability, a misconfiguration, an exposure, and the like. For example, in an embodiment, the second cybersecurity monitoring solution is further configured to scan the resource and detect a certificate, represented by certificate node 416.

In an embodiment, a source for a unification environment is an identity and access management (IAM) service. In some embodiments, an IAM service includes a rule, a policy, and the like, which specify an action a principal is allowed to initiate, an action which a principal is not allowed to initiate, combinations thereof, and the like.

In some embodiments, an IAM service is queried to detect an identifier of a principal. The principal is represented in the graph by principal node 720, and is, according to an embodiment, a user account, a service account, a role, and the like. In an embodiment, the IAM service is further queried to detect an identifier of a key, an identifier of a policy, and the like, which are associated with a principal. For example, in an embodiment, a cloud key which is assigned to a principal represented by the principal node 720, is represented by a cloud key node 422. In an embodiment, the cloud key represented by the cloud key node 422 allows the principal represented by the principal node 720 to access the resource represented by the resource node 710.

In some embodiments, a resource is represented by a plurality of resource nodes, each resource node corresponding to a unique data source. In such embodiments, it is useful to generate an uber node which is connected to each node which represents the resource. In an embodiment, generating an uber node and storing the uber node in the graph allows to generate a compact view of assets of a compute environment, while allowing traceability of the data to each source. An example embodiment of such a representation is discussed in more detail with respect to FIG. 3 below.

Figure 5:
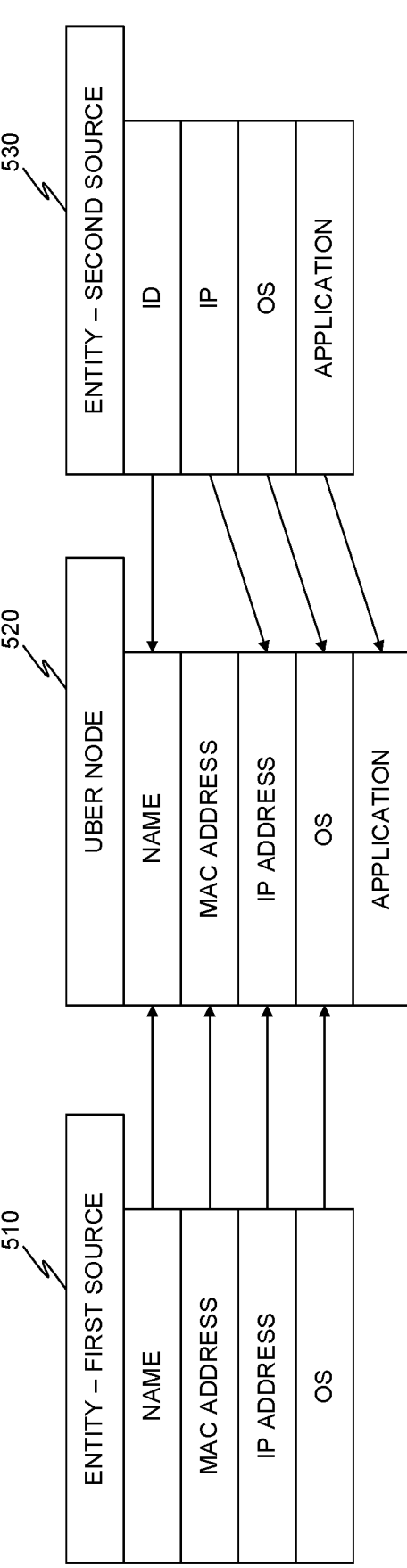
FIG. 5 is an example schematic illustration of an uber node of a representation graph, implemented according to an embodiment.

FIG. 5 is an example schematic illustration of an uber node of a representation graph, implemented according to an embodiment. In an embodiment, a mapper is configured to receive data from multiple sources, detect an entity represented by a plurality of sources, and map data fields from each source to a data field of an uber node which represents the entity in a graph data structure. For example, a first entity 510 is represented by a first source using a first data schema, and a second entity 530 is represented by a second source using a second data schema, in an embodiment. In certain embodiments, the first source is, for example, a SaaS solution provided by Servicenow®, and the second source is, for example, a SaaS solution provided by Rapid7. Each source interacts with a compute environment, the resources therein, the principals therein, and the like, in a different manner, using different methods, and store data utilizing different data structures, in accordance with an embodiment.

In an embodiment, the first entity 510 includes a first plurality of data fields, such as 'name', 'MAC address', 'IP address', and 'OS'. In some embodiments, the second entity 530 includes a second plurality of data fields, such as 'ID', 'IP', 'OS', and 'Application'. In certain embodiments, a mapper is configured to detect values of data fields which match the first entity 510 to the second entity 530. In some embodiments, the mapper is further configured to map the data fields of each of the sources to a data field of an uber node 520, which is a representation of an entity based on a plurality of different sources.

For example, in an embodiment the data field 'Name' of the first entity 510, and the data field 'ID' of the second entity 530, are mapped to the data field 'Name' of the uber node 530. In some embodiments, a mapper is configured to utilize a rule engine to match a first entity to a second entity and generate therefrom an uber node. For example, in an embodiment, a first entity 510 is matched to a second entity 520 based on a rule stipulating that a value of the data field 'Name' from a first source should match a value of the data field 'ID' of a second source. In some embodiments, a plurality of values from a first source are matched to a plurality of values from a second source, in determining that a first entity matches a second entity. For example, in an embodiment a plurality of values correspond to a unique identifier (e.g., 'name', 'ID', and the like) coupled with an IP address.

Figure 6:
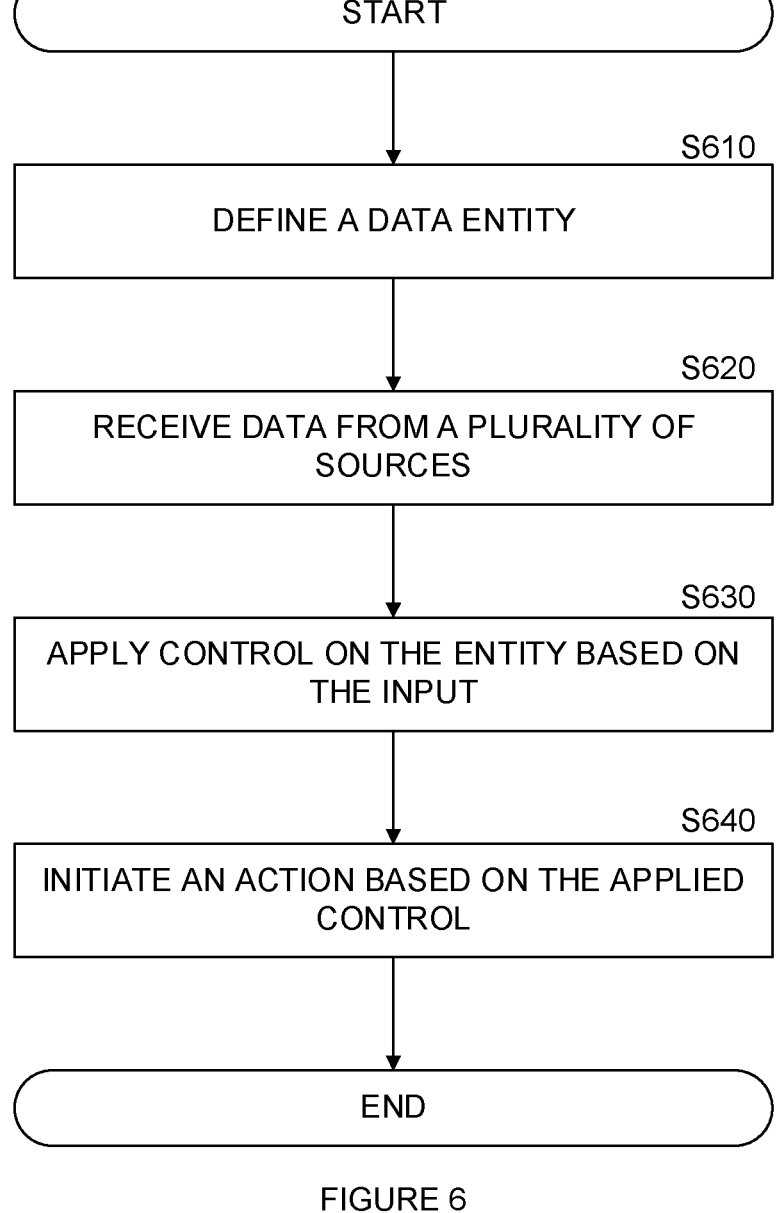
FIG. 6 is an example flowchart of a method for generating an application layer for a representation graph, implemented in accordance with an embodiment.

FIG. 6 is an example flowchart of a method for generating an application layer for a representation graph, implemented in accordance with an embodiment. In certain embodiments, a representation graph includes a plurality of nodes representing entities based on data received from multiple sources. In some embodiments, it is beneficial to expose data stored in the representation graph, for example via an application, an application programming interface (API), and the like. This allows to utilize the data in an efficient way, for example by aggregating from multiple data sources and executing queries, initiating actions, combinations thereof, and the like, at a central location (i.e., the application layer), rather than access each data source individually.

At S610, a data entity is defined. In an embodiment, a data entity is an uber node in a representation graph, and is generated utilizing the methods disclosed in more detail herein. In some embodiments, defining a data entity includes detecting a plurality of data fields, such that a first data field is detected in a first data source, and a second data field is detected in a second data source. In an embodiment, the detected data fields are associated with the data entity, for example by generating a data structure including the detected data fields.

In certain embodiments, a data entity is a data structure which is utilized to generate nodes in a representation graph, for example as detailed herein. Examples of data entities, according to some embodiments, include a group node (e.g., group node 220 of FIG. 2 above), a cloud entity node (e.g., resource node 710, principal node 720 of FIG. 4 above), an uber node (e.g., uber node 520 of FIG. 5 above), combinations thereof, and the like.

In some embodiments, a node in a representation graph, generated based on the data entity, is updated with data received from a first data source, a second data source, a combination thereof, and the like.

At S620, data is received from a plurality of sources. In an embodiment, a source is configured to provide data, for example by generating data records, such as events, logs, combinations thereof, and the like. In an embodiment, a data source is a cybersecurity monitoring system, such as endpoint detection and response (EDR) system (e.g., EDR system 122 of FIG. 1), an external attack surface management (EASM) system (e.g., EASM 124 of FIG. 1 above), a ticket system (e.g., ticketing system 142), a Software as a Service (SaaS) provider (e.g., SaaS provider 323 of FIG. 3), a cloud storage platform (e.g., cloud storage platform 324 of FIG. 3), a database, a cloud log system (e.g., CloudTrail®), combinations thereof, and the like.

In certain embodiments, data is received periodically. In some embodiments, data is received as an event stream. In an embodiment, receiving data includes initiating a data transfer between a data source and a unification environment which is configured to receive data and generate the application layer. In some embodiments, initiating a data transfer is performed using an API of the data source.

At S630, a control is applied on the data entity. In some embodiments, applying a control on a data entity includes applying a control on a plurality of nodes in a representation graph, each node of the plurality of nodes generated based on the data entity. In certain embodiments, the plurality of nodes are selected based on a security policy.

For example, in some embodiments, a plurality of nodes, each generated based on a single data entity, includes a first subset of nodes and a second subset of nodes, such that each subset is associated with a security policy, an access policy, a rule, a conditional rule, a combination thereof, and the like. In some embodiments, the security policy, the access policy, the rule, the conditional rule, combination thereof, and the like, are stored in a rule engine, such as rule engine 332 of FIG. 3 above.

In an embodiment, a control includes a conditional rule, a policy, a combination thereof, and the like. In certain embodiments, a control is applied by a rule engine. In certain embodiments, the control further includes an action. For example, an action is, in an embodiment, initiating a ticket group in a ticketing system, initiating scanning for a cybersecurity object in a computing system, generating a report based on data extracted from a node, the node generated based on the data entity, generating an alert, generating an event in an event log, a combination thereof, and the like.

In some embodiments, the control is provided by a service level agreement (SLA). In an embodiment, an SLA is a policy including a rule, a plurality of rules, and the like. In an embodiment, the SLA is checked periodically to determine if the conditions specified in the SLA are constantly, consistently, and the like, being met.

For example, according to an embodiment, a ticket is generated, e.g., in the ticketing system 142. In some embodiments, the generated ticket is updated based on data received from other sources, such as scanners, cybersecurity monitoring systems, and the like. In an embodiment, an SLA includes a timeframe for remediation (i.e., a timeframe during which a ticket needs to be resolved). In some embodiments, a ticket age value is determined, for example based on a timestamp stored when the ticket is generated, and the value is compared to a current time, in order to determine if the SLA is met (i.e., is the ticket age value less than a predetermined value specified by the SLA as a remediation time).

At S640, an action is initiated. In an embodiment, the action is initiated based on the applied control. In certain embodiments, an action is initiated in response to applying a conditional rule of the control, for example by utilizing data of a node in the representation graph as an input to the conditional rule. In some embodiments, where the conditional rule is satisfied (e.g., is true), the action is initiated.

In an embodiment, initiating an action includes initiating a ticket group in a ticketing system, initiating scanning for a cybersecurity object in a computing system, generating a report based on data extracted from a node, the node generated based on the data entity, generating an alert, generating an event in an event log, a combination thereof, and the like.

In some embodiments, a request to extract data from the node further includes an authorization indicator. For example, in an embodiment, the authorization indicator includes a user account identifier, a role identifier, a policy identifier, a secret, and the like. In certain embodiments, the request to extract data is executed in response to determining that the authorization indicator is authorized to receive the extracted data.

For example, in some embodiments, an identity and access management service is queried with the authorization indicator to determine if the request is an authorized request. The query includes, according to an embodiment, the authorization indicator, an identifier of the node, data extracted from the node, a portion of data extracted from the node, a combination thereof, and the like.

Figure 7:
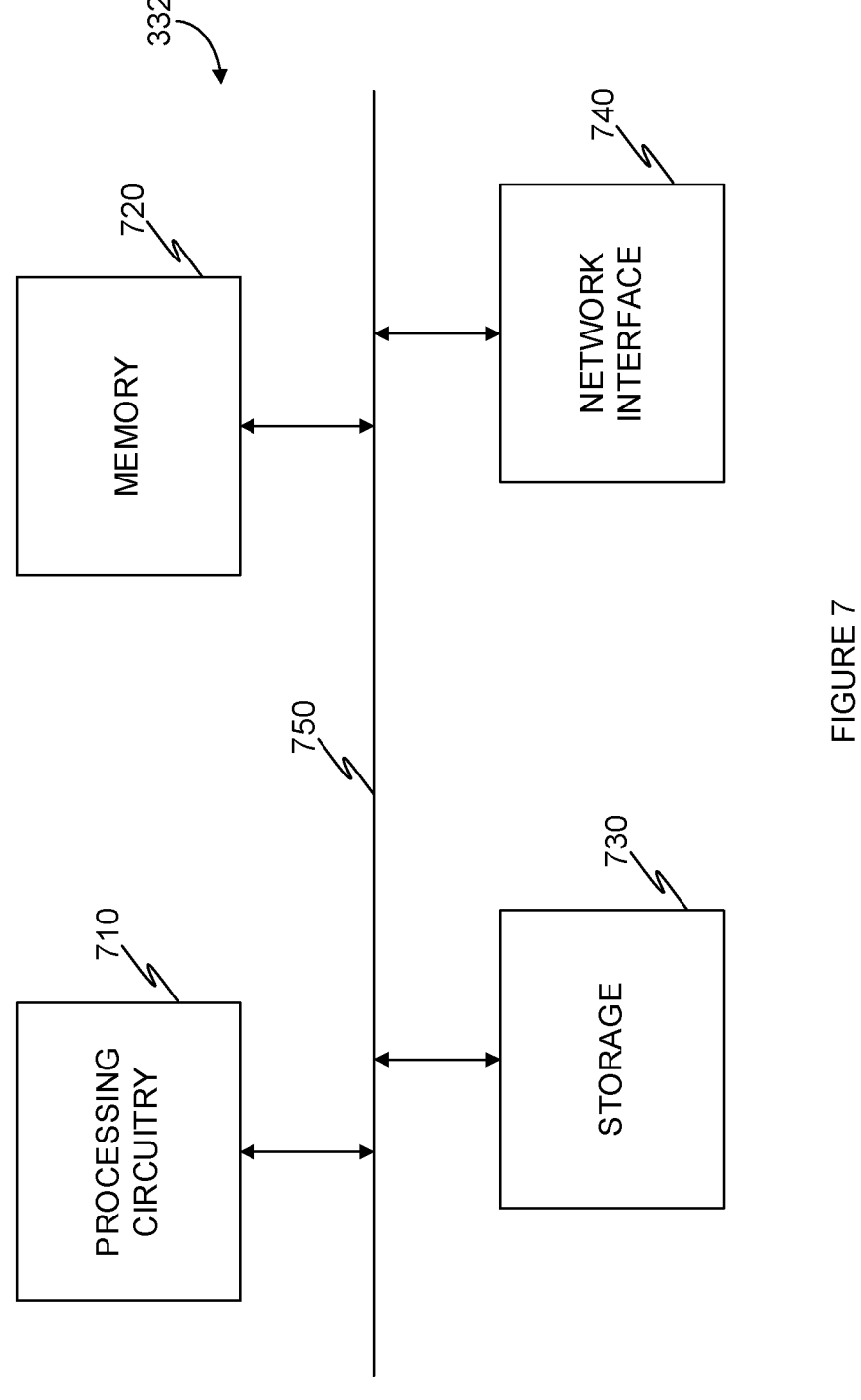
FIG. 7 is an example schematic diagram of a rule engine according to an embodiment.

FIG. 7 is an example schematic diagram of a rule engine 332 according to an embodiment. The rule engine 332 includes a processing circuitry 710 coupled to a memory 720, a storage 730, and a network interface 740. In an embodiment, the components of the rule engine 332 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof. In an embodiment, the memory 720 is an on-chip memory, an off-chip memory, a combination thereof, and the like. In certain embodiments, the memory 720 is a scratch-pad memory for the processing circuitry 710.

In one configuration, software for implementing one or more embodiments disclosed herein may be stored in the storage 730, in the memory 720, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 740 is configured to provide the rule engine 332 with communication with, for example, the mapper 334, the graph database 336, the cybersecurity monitoring systems, and the like.

It should be understood that the embodiments described herein are not limited to the specific architecture illustrated in FIG. 7, and other architectures may be equally used without departing from the scope of the disclosed embodiments.

Furthermore, in certain embodiments the mapper 334, the graph database 336, and additional workloads, resources, and the like of the unification environment 330, may be implemented with the architecture illustrated in FIG. 7. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating an application layer for a representation graph, in a computing system including processing circuitry communicatively coupled with a graph database, the method comprising:

defining a data entity in a representation graph, the data entity including a plurality of data fields;

generating a node based on the data entity in the representation graph, the node representing a unique entity;

receiving data respective of the unique entity from a plurality of data sources, such that a first data source of the plurality of data sources provides data to a first data field of the plurality of data fields, and a second data source of the plurality of data sources provides data to a second data field of the plurality of data fields, wherein receiving the data comprises, by a mapper, populating the plurality of data fields based on a mapping table that maps source-specific data fields of the plurality of data sources to the plurality of data fields, dynamically adding a data field upon detecting an unmapped source-specific data field, and aggregating the populated data fields from the plurality of data sources into a single node that stores metadata identifying a source of each populated data field;

applying a control to the node based on the received data including at least one conditional rule stored in a rule engine coupled to the graph database, including traversing the representation graph to evaluate the at least one conditional rule; and initiating an action, in response to the evaluation of the at least one conditional rule, based on applying the control to the received data, the action comprising one or more of generating an alert, updating a cybersecurity event log, or initiating a cybersecurity scan.

2. The method of claim 1, further comprising:

periodically accessing the first data resource to receive data respective of the unique entity.

3. The method of claim 1, further comprising:

applying the control including a service level agreement (SLA) policy on the node based on the received data.

4. The method of claim 1, further comprising:

initiating an action at the second data source, based on data received from the first data source.

5. The method of claim 4, wherein the first data source is a first cybersecurity monitoring solution, and the second data source is a second cybersecurity monitoring solution.

6. The method of claim 1, wherein the action includes: generating an alert, generating an event in an event log, generating a ticket, generating a ticket group, initiating a scan of a cybersecurity object, generating a report, and any combination thereof.

7. The method of claim 1, further comprising:

configuring an application programming interface (API) to extract data from the node in response to receiving a request for data.

8. The method of claim 7, further comprising:

extracting data from the node in response to further detecting that the request is an authorized request.

9. The method of claim 1, further comprising:

traversing an organization chart to detect a user account, the organization account including a plurality of unique user accounts, each user account associated with a role;

assigning a unique node of the representation graph to a user account, in response to detecting a data value of the user account which matches a data value of the unique node.

10. A non-transitory computer readable medium having stored thereon instructions for causing a processing circuitry in communication with a graph database to execute a process, the process comprising:

defining a data entity in a representation graph, the data entity including a plurality of data fields;

generating a node based on the data entity in the representation graph, the node representing a unique entity;

receiving data respective of the unique entity from a plurality of data sources, such that a first data source of the plurality of data sources provides data to a first data field of the plurality of data fields, and a second data source of the plurality of data sources provides data to a second data field of the plurality of data fields wherein receiving the data comprises, by a mapper, populating the plurality of data fields based on a mapping table that maps source-specific data fields of the plurality of data sources to the plurality of data fields, dynamically adding a data field upon detecting an unmapped source-specific data field, and aggregating the populated data fields from the plurality of data sources into a single node that stores metadata identifying a source of each populated data field;

applying a control including at least one conditional rule stored in a rule engine to the node based on the received data, including traversing the representation graph to evaluate the at least one conditional rule; and initiating an action, in response to the evaluation of the at least one conditional rule, based on applying the control to the received data, wherein the action comprises generating or updating cybersecurity event data.

11. A system for generating an application layer for a representation graph, comprising:

a processing circuitry; and a memory, the memory containing instructions that, when executed by the processing circuitry, configure the system to:

define a data entity in a representation graph, the data entity including a plurality of data fields;

generate a node based on the data entity in the representation graph, the node representing a unique entity;

receive data respective of the unique entity from a plurality of data sources, such that a first data source of the plurality of data sources provides data to a first data field of the plurality of data fields, and a second data source of the plurality of data sources provides data to a second data field of the plurality of data fields, wherein receiving the data comprises, by a mapper populating the plurality of data fields based on a mapping table that maps source-specific data fields of the plurality of data sources to the plurality of data fields, dynamically adding a data field upon detecting an unmapped source-specific data field, and aggregating the populated data fields from the plurality of data sources into a single node that stores metadata identifying a source of each populated data field;

apply a control including at least one conditional rule stored in a rule engine coupled to the graph database to the node based on the received data, including traversing the representation graph to evaluate the at least one conditional rule; and initiate an action, in response to the evaluation of the at least one conditional rule, based on applying the control to the received data, wherein the action comprises generating or updating cybersecurity event data.

12. The system of claim 11, wherein the memory includes further instructions which when executed by the processing circuitry further configure the system to:

periodically access the first data resource to receive data respective of the unique entity.

13. The system of claim 11, wherein the memory includes further instructions which when executed by the processing circuitry further configure the system to:

apply the control including a service level agreement (SLA) policy on the node based on the received data.

14. The system of claim 11, wherein the memory includes further instructions which when executed by the processing circuitry further configure the system to:

initiate an action at the second data source, based on data received from the first data source.

15. The system of claim 14, wherein the first data source is a first cybersecurity monitoring solution, and the second data source is a second cybersecurity monitoring solution.

16. The system of claim 11, wherein the memory includes further instructions which when executed by the processing circuitry further configure the system to initiate an action including: generating an alert, generating an event in an event log, generating a ticket, generating a ticket group, initiating a scan of a cybersecurity object, generating a report, and any combination thereof.

17. The system of claim 11, wherein the memory includes further instructions which when executed by the processing circuitry further configure the system to:

configure an application programming interface (API) to extract data from the node in response to receiving a request for data.

18. The system of claim 17, wherein the memory includes further instructions which when executed by the processing circuitry further configure the system to:

extract data from the node in response to further detecting that the request is an authorized request.

19. The system of claim 11, wherein the memory includes further instructions which when executed by the processing circuitry further configure the system to:

traverse an organization chart to detect a user account, the organization account including a plurality of unique user accounts, each user account associated with a role;

assign a unique node of the representation graph to a user account, in response to detecting a data value of the user account which matches a data value of the unique node.

20. The system of claim 11, wherein the processing circuitry further comprises a hardware accelerator comprising one of a field programmable gate array (FPGA), application-specific integrated circuits (ASIC), or graphics processing unit (GPUs) and a scratch-pad memory, the hardware accelerator configured to offload neighbor-expansion operations for traversal of the representation graph by performing parallel evaluation of adjacency lists for a plurality of nodes.

* * * * *